United States Patent Office 3,499,763
Patented Mar. 10, 1970

3,499,763

BIS PHENOLS AS HIGH OPACITY DIAZOTYPE COUPLERS

Nicholas J. Clecak, San Jose, and Robert J. Cox, Los Gatos, Calif., assignors to International Business Machines Corporation, Armonk, N.Y., a corporation of New York

No Drawing. Filed May 1, 1967, Ser. No. 634,862
Int. Cl. G03c *1/58, 5/34;* C07c *39/16*
U.S. Cl. 96—91 6 Claims

ABSTRACT OF THE DISCLOSURE

This application discloses, for use as azo couplers, for diazotype materials, phenolic compounds of the formula:

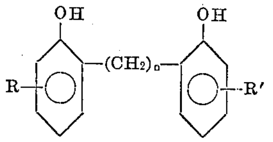

wherein *n* is 1–3 and wherein R and R′ are selected from the group consisting of hydrogen, lower alkyl, and halogen.

BACKGROUND OF THE INVENTION

Field of the invention

The invention relates to diazotype light sensitive materials and, more particularly, to certain azo couplers, processes for preparing them, and their use in the light sensitive materials.

Description of the prior art

In the reproduction of machine drawings, printed material, pictures, and other original material, it is often advantageous to prepare a master on transparent or semitransparent diazo copying material and to use this master as an original for the production of further copies. The master is obtained by exposure to actinic light of transparent or semi-transparent light sensitive diazotype material either by the direct or by the reflex process. Preferably, the exposed material is then developed by high pressure gaseous ammonia, as described in copending application, Ser. No. 369,861, filed May 25, 1964 now Patent Number 3,411,906.

In such a reproduction system, it is important to have an azo coupling component in diazo copying material which is stable against premature coupling, which does not essentially diffuse in the material, which forms a dye for reprint with mercury arc light source, and which is suitable for forming color mixtures with other azo couplers.

SUMMARY OF THE INVENTION

Accordingly, an object of the present invention is to provide a diazo master having an azo coupling component which is stable against premature coupling.

A further object of the present invention is to provide a diazo master having an azo coupling component which combines to form a dye particularly suited for producing further copies with a mercury arc as the light source.

Another object is to provide new and useful bis phenolic couplers and novel processes for preparing these couplers.

One of the advantages of the bis phenolic couplers of the present invention is their reduced diffusion. This greatly reduces migration of the couplers throughout the light sensitive layer and thus insures a dye density after prolonged storage which is essentially the same as the original density obtainable immediately after coating.

In accordance with the foregoing objects and advantages, the light sensitive diazotype material of this invention comprises a light sensitive diazonium compound and at least one azo coupler or component, which is a bisphenol of the general formula:

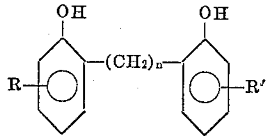

wherein *n* is 1–3, and wherein R and R′ are selected from the group consisting of hydrogen, lower alkyl, and halogen.

In the following, azo components are described which, when coupled with diazo compounds, will give dyestuffs of excellent covering power and, therefore, are highly suitable for the preparation of diazotype reproduction coatings for intermediate originals, and which, also, because of the yellowish green color of the product obtained when coupling them with diazo compounds of the known light sensitive types, are suitable for the production of color mixtures, in particular for the production of browns and blacks.

DESCRIPTION OF THE PREFERRED EMBODIMENTS

Examples of the azo couplers according to the invention are.

0,0′-methylene-bis-phenol
0,0′-dihydroxybibenzyl
0,0′-bis-1,3-trimethylene phenol
0,3-(2-hydroxy-4-methylphenyl) propylphenol
0,3-(2-hydroxy-4-chlorophenyl) propylphenol The 0,0′-methylene-bis phenol is commercially available as named from, for example, Eastman Organic Chemicals.

The 0,0′-dihydroxybibenzyl was prepared by the method described in J. Indian Chemical Society, 33, 545 (1956) as a white solid having a melting point of 112–113° C.

According to another feature of the present invention, the 0,0′-dihydroxybibenzyl and halo- and lower alkyl-substituted 0,0′-dihydroxybibenzyl within the following structural formula:

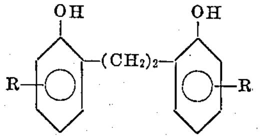

wherein R is selected from the group consisting of hydrogen, lower alkyl, and halogen, and is at the same position relative to the hydroxy group on both rings, are prepared by starting with the condensation compound which is prepared according to the J. Indian Chemical Society literature method for 2,2′-dimethoxy benzoin, and which has the following structural formula:

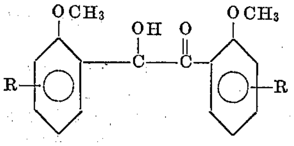

wherein R is the same as above, the improvement comprising the steps of: oxidizing the above compound with a mild oxidizing, preferably ammonium nitrate, to a compound having the following structural formula:

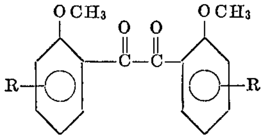

wherein R is the same as above, hydrolyzing the above compound with a hydrolyst, such as hydrogen bromine and hydrogen iodine and preferably pyridine hydrochloride, to a compound having the following structural formula:

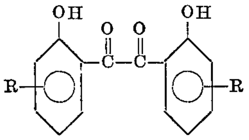

wherein R is the same as above, and reducing the above compound with a reducing agent selective for carbonyl groups, such as hydrazine which is preferred, to yield the 0,0′-dihydroxybibenzyl, and halo- and lower alkyl-substituted 0,0′-dihydroxybibenzyl of the above structural formula.

For example, 0,0′-dihydroxybibenzyl was prepared as follows:

A mixture of 2 moles of 0-methoxybenzaldehyde,
822 cc. of 50% aqueous ethanol, and
27 g. of potassium cyanide, was charged to a round-bottomed flask and refluxed for five hours. The reaction mixture was slurried with ether and filtered. The precipitate was recrystallized from an ethanol-ether mixture and 2,2′-dimethoxybenzoin M. 98–99° was obtained in 35% yield.

Following this, a mixture of

.35 mole of 2,2′-dimethoxybenzoin,
318 cc. of 80% aqueous acetic acid,
45.4 g. of ammonium nitrate, and
.8 g. cupric carbonate, was refluxed in a round-bottomed flask for 1½ hours. The reaction mixture was poured into a beaker and cooled in an ice bath. The precipitate was washed with water and dried M. 128–30°. The yield of o-anisil was 99%.

Next, a mixture of

.34 mole of o-anisil, and
186 g. of pyridine hydrochloride, was heated with stirring in a round-bottomed flask and refluxed for two hours. The reaction mixture was poured into ice water, made acidic with dilute hydrochloric acid, the precipitate filtered, washed with water and recrystallized from benzenepetroleum ether (Darco). A 70.5% yield of salicyl M. 153–5° was obtained.

Finally, a mixture of

.24 mole of salicyl,
66 ml. of 85% hydrazine hydrate,
294 ml. of diethylene glycol, and
138 g. of potassium hydroxide, was charged to a round-bottomed flask and heated to reflux for 1 hour. The condenser was removed and the temperature was allowed to rise to 195°. The condenser was then replaced and refluxing continued for 2½ hours. The reaction mixture was poured into ice, made acidic with hydrochloric acid, filtered, washed with water, and recrystallized from methanol-water. After one further recrystallization from benzene-hexane, 83% of 0,0′-dihydroxybibenzyl, M. 113–4° was obtained.

The 0,0′-bis-1,3-trimethylene phenol, which is the preferred azo coupler, was prepared as outlined in J. Applied Chemistry 1, 225 (1951). The following is a specific example of the preparation of this compound:

A mixture of

.224 mole of o-hydroxy acetophenone,
.224 mole of salicylaldehyde,
70.5 g. of potassium hydroxide (86%),
81 ml. of ethanol, and
61 ml. of water, was charged to an autoclave and heated to 52° for 17 hours. The reaction mixture was cooled and acidified with hydrochloric acid. The precipitate of crude 2,2′-dihydroxychalcone was recrystallized 2 times from toluene and a 30% yield of pure compound M. 160–62° was obtained.

Next, a mixture of 0.087 mole of 2,2′-dihydroxychalcone,
300 ml. of 95% ethanol, and
about 1 g. of 10% palladium on carbon catalyst, was charged to a Parr low pressure hydrogenator, a pressure of 50 p.s.i. of hydrogen applied, and the reaction mixture was shaken until 8.5 p.s.i. of hydrogen had been used.

The reaction mixture was filtered to remove the catalyst, the ethanol evaporated from the filtrate and the solids recrystallized from benzene-petroleum ether. White crystals of 1,3-bis-o-hydroxyphenyl-prop-1-one M. 88–9° were obtained in 76% yield.

Finally, a mixture of

.065 mole of 1,3-bis-o-hydroxyphenylprop-1-one,
22.7 g. of potassium hydroxide (86%),
79 ml. of diethylene glycol, and
8.8 ml. of 85% hydrazine hydrate, was charged to a round-bottomed flask with a condenser and heated to reflux for one hour. The condenser was removed, the temperature allowed to rise to 190°, then replaced, and held for 3 hours. The reaction mixture was poured into ice water, made acidic with hydrochloric acid, the precipitate filtered and washed with water. After being dried in a vacuum oven the 0,0′-bis-1,3-trimethylenephenol was obtained as a white solid M. 96–7° in 98% yield.

According to another feature of the present invention, the condensation step of the above process can be replaced with the following step in which dimethylsulfoxide is the reaction solvent and an alkali hydroxide, such as potassium hydroxide, lithium hydroxide and, preferably, sodium hydroxide is employed. In general, a compound of the general formula:

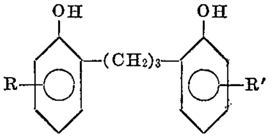

wherein R and R′ are selected from the group consisting of hydrogen, lower alkyl, and halogen is prepared by condensing compounds of the general formulas:

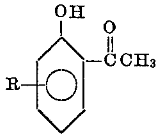

wherein R is the same as above, and

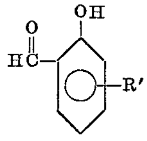

wherein R′ is the same as above.

More specifically, this step was carried out in preparing 0,0'-bis-1,3-trimethylenephenol in the following manner:

A mixture of 3.5 moles 2-hydroxyacetophenone,
3.5 moles salicylaldehyde,
620 g. 50% sodium hydroxide, and
1550 ml. dimethylsulfoxide, was charged to a 5-liter round-bottomed flask and with stirring was heated at 95° for 2 hours. The reaction mixture was poured into ice water, acidified with 12 N HCl and let stand 1 hour. The precipitate was filtered, washed two times with hot water and again filtered. The material was then slurried in diethyl ether, an equal amount 30–60° petroleum ether added to the slurry, and then filtered. A yield of 42% of the compound was obtained.

The lower alkyl- and halo-substituted 0,0'-bis-1,3-trimethylene phenols can also be prepared with the above described improved condensation step of the present invention. For example, 0,3-(2-hydroxy-4-methylphenyl) propylphenol and 0,3-(2-hydroxy-4-chlorophenyl) propylphenol are prepared by condensing 2-hydroxy-4-methylacetophenone and 2-hydroxy-4-chloroacetophenone, respectively, which are prepared according to the literature reference in Chemical Abstracts, vol. 57, page 2115, with salicylaldehyde in a reaction solvent of dimethylsulfoxide and an alkali hydroxide.

In addition, 0,3-(2-hydroxy-4-methylphenyl) propylphenol can be and was prepared as follows:

A mixture of 82 g. of freshly distilled m-cresol,
163 g. of acetic anhydride, and
3 drops of concentrated sulfuric acid, was charged to a flask and heated on a steam bath for 1 hour. The reaction mixture was then poured into water, ether extracted, dried, the ether removed, and the residue vacuum distilled. m-Cresol acetate boiling at 101° at 13 mm. pressure was obtained in 84% yield.

Next, a mixture of 50 g. of m-cresol acetate was charged to a 3-necked flask equipped with stirrer and condenser. This was heated to 130–40° C. and 40 g. of aluminum chloride was added portion-wise over about 10 minutes. The temperature was raised to 160° C. and maintained for 45 minutes. The reaction mixture was then cooled and treated with 10% hydrochloric acid until all the solids went into solution. This solution was ether extracted, the ether dried and removed by evaporation. The residue was distilled under vacuum and a 45% yield of 2-hydroxy-4-methyl acetophenone, B. 91.3° C. at 5 mm., was obtained.

Following this, a mixture of 21 g. of 2-hydroxy-4-methylacetophenone,
17 g. of salicylaldehyde,
45 g. of potassium hydroxide,
51 ml. of ethanol, and
38 ml. of water, was charged to an autoclave and heated for 17 hours at 52° C. At the end of this time the reaction mixture was poured into ice water, acidified with concentrated hydrochloric acid and the precipitated solids recrystallized 3 times from toluene and once from ethanol to a melting point of 178–80° C. Thus, 1-(2-hydroxy-4-methylphenyl)-3-(2-hydroxyphenyl)-2-propene-1-one was isolated.

Thereafter, a mixture of 2.1 gm. of 1-(2-hydroxy-4-methylphenyl)-3-(2-hydroxyphenyl)2-propene-1-one,
50 ml. of ethanol, and
a catalytic amount of 10% palladium on charcoal, was charged to a Parr low pressure hydrogenator and reduced under 50 p.s.i. initial pressure of hydrogen. When the uptake of hydrogen stopped, the reaction mixture was filtered and cooled. A white precipitate of 1-(2-hydroxy-4-methylphenyl)-3-(2-hydroxpyhenyl)-1-propanone which recrystallized from ethanol to a melting point of 116–17° C. was obtained in 85% yield.

Finally, a mixture of 1.4 g. of 1-(2-hydroxy-4-methylphenyl)-3-(2-hydroxyphenyl)-1-propanone,
1.5 g. of potassium hydroxide,
10 ml. of diethylene glycol, and
0.7 ml. of 85% hydrazine hydrate.

was charged to a flask equipped with a reflux condenser and heated for 1 hour at 140° C. The condenser was removed and the temperature raised to 190° C. and held for 3 hours. The reaction mixture was then poured into ice water made acidic with hydrochloric acid and the precipitated solid recrystallized 2 times from aqueous ethanol. A 60% yield of 0,3-(2-hydroxy-4-methylphenyl) propylphenol, M. 132–3° was obtained. It was found to have the following combustion analysis.

Calcd. for $C_{16}H_{18}O_2$ (percent): C, 79.30; H, 7.48. Found (percent): C, 78.98; H, 7.54.

The preparation of 0,3-(2-hydroxy-4-chlorophenyl) propylphenol proceeded in a completely analogous way to the preparation of its methyl analog except, of course, m-chlorophenol was the starting compound. The only significant difference was that in the final reduction with hydrazine hydrate, thin layer chromatography revealed the presence of two materials and the isolation of pure material required a chromatographic separation. 0,3-(2-hydroxy-4-chlorophenyl) propylphenol was thus isolated as a white solid, M. 116.5–117.5° C. and had the following combustion analysis.

Calcd. for $C_{15}H_{15}ClO_2$ (percent): C, 68.57; H, 5.75; Cl, 13.49. Found (percent): C, 68.78; H, 5.92; Cl, 13.51.

Further compounds falling within the scope of the invention can be prepared in a manner analogous to those described above.

Such compounds include:

2,2'-bis-1,3-trimethylene-5-methylphenol
2,2'-bis-1,3-trimethylene-6-methylphenol
2,2'-bis-1,3-trimethylene-5-chlorophenol
2,2'-bis-1,3-trimethylene-6-chlorophenol
2,3-(2-hydroxy-4-chlorophenyl)propyl-3-methylphenol
2,3-(2-hydroxy-4-chlorophenyl)propyl-5-methylphenol
2,3-(2-hydroxy-2-chlorophenyl)propyl-3-methylphenol
2,2'-bis-ethylene-5-methylphenol
2,2'-bis-ethylene-5-chlorophenol
2,2'-bis-ethylene-3-methylphenol
2,2'-bis-ethylene-3-chlorophenol
2,2'-bis-ethylene-3-bromophenol
2,2'-bis-ethylene-3-ethylphenol
0,3-(2-hydroxy-4-ethylphenyl) propylphenol
0,3-(2-hydroxy-4-bromophenyl) propylphenol
0,3-(2-hydroxy-3-methylphenyl) propylphenol
0,3-(2-hydroxy-3-chlorophenyl) propylphenol
0,3-(2-hydroxy-3-ethylphenyl) propylphenol
0,3-(2-hydroxy-3-bromophenyl) propylphenol
0,3-(2-hydroxy-5-methylphenyl) propylphenol
0,3-(2-hydroxy-5-chlorophenyl) propylphenol
0,3-(2-hydroxy-5-ethylphenyl) propylphenol
0,3-(2-hydroxy-5-bromophenyl) propylphenol
0,3-(2-hydroxy-6-methylphenyl) propylphenol
0,3-(2-hydroxy-6-chlorophenyl) propylphenol
0,3-(2-hydroxy-6-ethylphenyl) propylphenol
0,3-(2-hydroxy-6-bromophenyl) propylphenol The bis phenols of the present invention are employed as the azo coupling component in diazo-type materials. This aspect of the invention is illustrated in the following examples.

*Example I.*—The following formulation was imbided in a cellulose acetate layer carried on a polyethylene terephthalate film:

30 ml. of methylethyl ketone
20 ml. of methanol
1 g. of citric acid
0.5 g. of sulfosalicylic acid
0.2 g. of zinc chloride
1 g. of 2,5-diethoxy-4-morpholinobenzene-diazonium fluoborate
1.9 g. of 0,0′-bis-1,3-trimethylenephenol The film was exposed for 3 seconds to a 250 watt high pressure mercury arc while in contact with a negative transparency. After treatment with ammonia gas at 90 p.s.i. to develop the unexposed areas, a yellow dye resulted which is very high opaque to the wavelengths of light of a mercury arc.

*Examples II–V.*—The procedure and formulation of Example I was followed except that the coupler 0,0′-bis-1,3-trimethylenephenol was replaced as follows:

| Example: | Coupler |
|---|---|
| II | 0,0′-methylene-bis-phenol. |
| III | 0,0′-dihydroxybibenzyl. |
| IV | 0.3 - (2-hydroxy-4-chlorophenyl)propylphenol. |
| V | 0,3-(2 - hydroxy-4-methylphenyl)propylphenol. |

In all these examples, a yellow dye resulted in the unexposed and developed areas and this dye was very highly opaque to the wavelengths of light of a mercury arc.

While the invention has been particularly shown and described with reference to preferred embodiments thereof, it will be understood by those skilled in the art that variations in form may be made therein without departing from the spirit and scope of the invention.

What is claimed is:

1. Light sensitive diazotype materials comprising a base support having a composition thereon, said composition comprising a light sensitive diazonium compound, and, as a coupling component, a compound of the following general formulas:

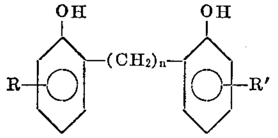

wherein $n$ is 1–3 and wherein R and R′ are selected from the group consisting of hydrogen, lower alkyl, and halogen.

2. The diazotype materials of claim 1 wherein the coupling component is 0,0′-methylene-bis-phenol.

3. The diazotype materials of claim 1 wherein the coupling component is 0,0′-dihydroxybibenzyl.

4. The diazotype materials of claim 1 wherein the coupling component is 0,0′-bis-1,3-trimethylene phenol.

5. The diazotype materials of claim 1 wherein the coupling component is 0,3-(2-hydroxy-4-methylphenyl) propylphenol.

6. The diazotype materials of claim 1 wherein the coupling component is 0,3-(2-hydroxy-4-chlorophenyl) propylphenol.

References Cited

UNITED STATES PATENTS

| | | | |
|---|---|---|---|
| 2,432,593 | 12/1947 | Straley | 96—91 |
| 2,593,839 | 4/1952 | Buc | 96—75 |
| 2,717,832 | 9/1955 | Sulich | 96—91 |
| 2,940,852 | 6/1960 | Herrick et al. | 96—91 |
| 3,169,864 | 2/1965 | Holmen | 96—91 XR |
| 3,183,093 | 5/1965 | Schlesinger et al. | 96—91 |
| 3,433,766 | 3/1969 | Holmen | 96—91 XR |

FOREIGN PATENTS

| | | |
|---|---|---|
| 651,691 | 11/1948 | Great Britain. |

NORMAN G. TORCHIN, Primary Examiner

C. BOWERS, Assistant Examiner

U.S. Cl. X.R.

96—49; 260—619